United States Patent Office 3,010,916
Patented Nov. 28, 1961

3,010,916
COMPOSITION COMPRISING ISOOLEFIN-DIOLEFIN COPOLYMER AND PREPARATION OF CLOSED CELL PRODUCT THEREFROM
Robert W. Pooley, South Bend, Ind., assignor to United States Rubber Company, New York, N.Y., a corporation of New Jersey
No Drawing. Filed Apr. 18, 1958, Ser. No. 729,255
15 Claims. (Cl. 260—2.5)

This invention relates to a method of making gas-expanded elastomeric material, and more particularly it relates to a greatly simplified method of making closed-cell expanded elastomeric material that does not require unduly multiplied or prolonged processing steps to effect shaping, expansion, and cure of the material. The invention also relates to compositions useful in the method, and cellular articles produced from such compositions.

The methods heretofore in use for making cellular elastomeric materials have generally involved molding the elastomeric composition containing a vulcanizing agent and a blowing agent in a mold having a cavity which was a miniature of the desired shape. The molding conditions commonly were such that the composition was vulcanized only partially, but the temperature was sufficiently elevated to decompose the blowing agent. Pressure was maintained on the mold while the molded miniature was cooled down, and thereafter the molding press was opened, and the miniature was removed, and thereafter re-heated to a temperature sufficient to complete the vulcanization. The miniature also expanded to the finally desired shape during such re-heating.

The just-described method required cooling of the miniature in the press before the mold could be opened, otherwise there would be a tendency for the mass to rupture, with loss of gas and consequent production of a defective, malformed article. Since the molding press was a heavy, expensive piece of equipment, production costs were undesirably high because of the relatively long time required in the press to complete the heating and cooling cycle.

It has also been proposed to prevulcanize a miniature shape without decomposing the blowing agent, and thereafter heat it to a higher temperature to decompose the blowing agent and complete the vulcanization. Such a method requires multiple heating steps under carefully regulated conditions, and has not, insofar as the present inventor is aware, proven to be a commercially practical way of producing truly closed-cell material of good quality on a large scale.

Accordingly, one object of the invention is to provide a method of making cellular elastomeric material that does not require a prolonged heating and cooling cycle in a press.

Another object is the provision of a method in which a minimum number of steps are necessary to produce an expanded article of desired shape.

Still a further object is to provide a method in which a single heating step suffices to expand and cure the article.

Yet another object is the provision of a method that is adapted to continuous production of closed-cell expanded elastomeric articles.

The present invention is based on the discovery that cellular elastomeric materials of excellent quality can be produced by compounding butyl rubber with certain vulcanizing agents and a certain blowing agent, extruding this composition at a temperature insufficient to vulcanize the rubber or to decompose the blowing agent, such extrusion producing a shape which is a miniature of the finally desired expanded article. Upon heating such extruded miniature to vulcanizing temperature in the open it is surprisingly found that a closed-cell, expanded, cured butyl rubber article is obtained that is a replica on an enlarged scale of the extruded miniature. The success of the method is critically dependent upon the selection of butyl rubber as the elastomer, as well as the selection of a particular combination of curatives for the butyl rubber, together with the selection of a specific blowing agent.

The elastomer employed in the invention, namely, butyl rubber, is, as is well known, a rubbery copolymer of an isoolefin (such as isobutylene or its equivalents) with a diolefin (such as isoprene or its equivalents). Butyl rubber is rather peculiar in that it has relatively little unsaturation in comparison to the other typical sulfur vulcanizable elastomers, and it typically contains only from about 0.5 to 5%, and seldom more than 10%, of the copolymerized diene. The isoolefins employed in making butyl rubber generally have from 4 to 7 carbon atoms and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Sometimes the butyl rubber molecule includes halogens such as chlorine or bromine, introduced therein by known means.

In practicing the invention the butyl rubber is compounded with a combination of vulcanizing ingredients, one of which is p-quinonedioxime or dibenzoyl-p-quinonedioxime and the other of which is benzothiazyl disulfide, together with either tetrachloro-p-benzoquinone or sulfur (or both of the last two). In general the permissible ranges of proportions of these ingredients are as follows:

| | |
|---|---|
| Butyl rubber | 100 parts. |
| p-Quinonedioxime (and/or dibenzoyl-p-quinonedioxime) | 0.25 to 4 parts (preferred 0.5 to 2 parts). |
| Benzothiazyl disulfide | 1 to 4 parts (preferred 2 to 4 parts). |
| Tetrachloro-p-benzoquinone, and/or sulfur | 0.5 to 4 parts (preferred 1 to 2 parts). |

The composition may further include other conventional compounding ingredients such as the usual zinc oxide, stearic acid, various plasticizers or lubricants, fillers or reinforcing agents such as carbon black, etc., in any suitable desired amounts.

Particularly preferred compositions for use in the invention contain polyethylene resin (whether of the low density or high density type), usually in amount of from 5 to 100 parts per 100 parts of the butyl rubber, and preferably in amount of from 15 to 25 parts. It has been found that such butyl rubber compositions containing polyethylene and processed in accordance with the present method are characterized by most surprising dimensional stability, that is, the expanded articles made in the manner substantially retain their original size and shape throughout prolonged periods of use. These preferred compositions containing polyethylene are remarkable for their very low water absorption. In general, the lower the molecular weight of the polyethylene, the larger is the proportion we can use. The high density type of polyethylene is especially useful for high temperature uses.

The method of the invention has been found to be operative when the blowing agent is azodicarbonamide. This blowing agent is capable, in the present compound, of decomposing at temperatures of 280° F. or higher (depending on the amount present and the duration of the exposure), to liberate gas which forms closed pores or cells in the elastomer, when the method of the invention is followed. For purposes of the invention this blowing agent is mixed with the butyl rubber in amount of from 1 to 20 parts per 100 parts of butyl rubber, and preferably 8 to 14 parts.

The required ingredients are mixed together in conventional rubber or plastic mixing equipment, such as a two roll mill or an internal mixer. The azodicarbonamide and the specified combination of curatives are mixed into the butyl rubber at temperatures well below the decomposition temperature of the azodicarbonamide and well below the curing temperature. Preferably these ingredients are blended in at a temperature as low as 200° F. or thereabouts. When polyethylene is included in the mixture, it is blended with the butyl rubber at a temperature sufficiently high to insure softening of the polyethylene, ranging from 200° to 300° F., and preferably from 230° to 350° F. (the azodicarbonamide and the specified curatives of course being reserved for subsequent addition at a lower temperature).

The thus uniformly blended composition is thereafter extruded to form an article which has the cross-sectional shape of the finally desired article, but which is a miniature thereof. The conditions of the extrusion are such that no vulcanization takes place and no decomposition of the blowing agent occurs at this stage. The extrusion may be carried out essentially at room temperature, and, in general, the maximum temperature developed during the extrusion is about 275° F.

The extruded miniature is essentially a stable material, that is, it can be stored or shipped if desired, and blown and vulcanized at a later date, with or without further prior treatment such as cutting into desired lengths, or plying up (suitably under pressure) multiple layers of the same material to make a thicker article, or plying up with layers of other material such as fabric or non-expandable compositions of butyl rubber or other material.

In an advantageous form of the invention involving continuous or semi-continuous production the extruded miniature may be led into an oven or equivalent heating area wherein it is subjected, for the first time, to a temperature sufficiently elevated to cause vulcanization of the butyl rubber and decomposition of the azodicarbonamide blowing agent. For this purpose the extruded miniature is heated in the open, that is, under free blowing conditions in the absence of a positive restraining means such as a mold or autoclave, to a temperature of from about 280 to 400° F., and preferably from about 320 to 350° F., for a period of about 10 minutes to 2 hours, depending on such variables as the exact composition, the size and shape of the article, and the character of the heating device. In general, the time and temperature are inversely related and the higher temperatures are more suitable for use with thinner sections. Under the specified conditions it is surprisingly found that the extruded miniature shape, critically compounded as described, vulcanizes and simultaneously expands to form a closed-cell material containing very fine, uniformly distributed pores, the final mass having good strength, abrasion resistance, and excellent shock-absorbing and thermal insulating qualities. It will be appreciated that such formation of closed cells by a free blowing process as described in a material that has not been prevulcanized is indeed an unexpected effect, since it would be anticipated, if anything, that heating the unvulcanized extruded miniature to a temperature sufficient to decompose the blowing agent would simply result in loss of gas, with consequent rupture and collapse of the mass. While it is not desired to limit the invention to any particular theory of operation, it is believed to be possible that the success of this unique method of forming a closed-cell expanded material is a consequence at least in large part of the peculiar nature of the described butyl rubber composition. This composition apparently possesses at the elevated temperatures employed for expansion and vulcanization, a special relationship between the rate of vulcanization and the rate of decomposition of the azodicarbonamide, such that the material vulcanizes sufficiently rapidly to prevent the generated gas from escaping, but not so rapidly as to prevent the material from expanding. Usually, rubber compositions subjected to vulcanizing temperatures achieve their most fluid state just prior to the setting in of the vulcanizing reaction. In the present instance it would appear to be possible that the blowing agent does not decompose appreciably until after such relatively fluid state has passed. Another possible explanation of the development of closed cells in the present process is that the composition described has, even in the substantially unvulcanized state and even at vulcanizing temperatures, sufficient film strength to prevent the small bubbles or pockets of gas from rupturing as the blowing agent decomposes, assuming that such decomposition sets in prior to appreciable vulcanization of the mass. The operability of the present procedure may also in significant part be a consequence of the low permeability of butyl rubber to gases, so that the tendency of gas to escape from the pores, with consequent collapse, is minimized. Regardless of the mechanism or explanation of the process, it has been determined that the described results are contingent upon the employment of the particular procedure and composition outlined.

The following examples, in which parts are expressed by weight, will serve to illustrate the invention in more detail.

EXAMPLE I

The ingredients listed in Section 3, below, were first mixed to form a masterbatch. The Butyl rubber was banded on a mill at a temperature of about 200°–250° F., and the other ingredients of the masterbatch are added in the order listed. This masterbatch can be stored for future use. The ingredients of Section B are then added to the masterbatch on the mill, in the order listed, at a temperature of 200°–250° F.

SECTION A—MASTERBATCH

| Ingredients | Parts |
| --- | --- |
| Isobutylene:isoprene copolymer rubber containing 2.5–3.0% isoprene ("Enjay 325") | 100 |
| Carbon black | 40 |
| Petrolatum | 15 |
| Stearic acid | 1 |
| Zinc oxide | 5 |

SECTION B—FINAL MIX

| Ingredients | Parts |
| --- | --- |
| Phthalic anhydride (retarder) | 1.6 |
| Sulfur | 1.6 |
| p-Quinonedioxime | 1.6 |
| Benzothiazyl disulfide | 3.3 |
| Wax | 10 |
| Azodicarbonamide | 10 |

The thus mixed stock was extruded from a conventional tuber in the form of a ½" square strip. The barrel and screw of the extruder were essentially at ambient temperature, while the die temperature was approximately 160°–170° F. The extruded material was laid on a shelf of an air oven which was heated to a temperature of 340° F. After 30 minutes the product was removed. The material had expanded to about 1" square. It had a smooth substantially continuous skin and a density of from about 8 to 10 pounds per cubic foot. When cut open, it revealed a fine, uniformly distributed pore structure, and it absorbed only about 0.02 pound of water per square foot of cut surface, indicating a truly closed (non-interconnecting) structure, characteristic of a good quality cellular material. The product had good low temperature properties, and the compression set was low.

EXAMPLE II

This example illustrates another composition used in the invention, containing tetrachloro-p-benzoquinone in place of sulfur. The ingredients shown in Sections A and B below were mixed and processed as described in Example I, with similar results.

SECTION A—MASTERBATCH

| | Parts |
|---|---|
| Isobutylene:isoprene copolymer rubber containing 2.0–2.5% isoprene ("Enjay 218") | 100 |
| Carbon black | 40 |
| Petrolatum | 10 |
| Stearic acid | 1 |
| Zinc oxide | 10 |

SECTION B—FINAL MIX

| | |
|---|---|
| Tetrachloro-p-benzoquinone ("Vulklor") | 1 |
| Benzothiazyl disulfide | 2 |
| p-Quinonedioxime | 1 |
| Azodicarbonamide | 10 |

In Examples I and II, dibenzoyl-p-quinonedioxime ("Dibenzo GMF") may be substituted for the p-quinonedioxime ("GMF") with equivalent results.

EXAMPLE III

This example illustrates the use of polyethylene along with the Butyl rubber.

Part 1:

| | Parts |
|---|---|
| Isobutylene:isoprene copolymer rubber containing 2.0–2.5% isoprene ("Enjay 218") | 100 |
| Polyethylene resin ("Alathon 10") | 25 |

Part 2:

| | |
|---|---|
| Carbon black | 40 |
| Oxidized castor oil ("Polycin 783" functions to reduce nerve of rubber) | 10 |
| Petrolatum | 30 |
| Stearic acid | 1 |
| Zinc oxide | 5 |
| Phthalic anhydride | 1 |

Part 3:

| | |
|---|---|
| Sulfur | 2 |
| p-Quinonedioxime | 2 |
| Benzothiazyl disulfide | 4 |
| Azodicarbonamide | 10 |
| Total | 226 |

The Butyl rubber is banded on a rubber mill at a temperature of 250° F., whereupon the polyethylene is added, and mixing is continued until the batch is uniform.

The ingredients listed under Part 2, above, are then added in conventional fashion, at a temperature of about 140°–200° F.

The stock may now be stored as a masterbatch, and the ingredients in Part 3 added as needed, on a mill at a temperature of from 160–200° F.

Extrusion is carried out on a conventional rubber tuber, using ambient barrel temperature (no heat applied) the die temperature being about 160–175° F.

Expansion is carried out by leading the extrudate onto a conveyor belt which passes through an oven heated to 340° F. to 350° F. Full expansion takes place within between 15 and 30 minutes, depending upon the thickness of the extruded material.

The resulting material is noteworthy for its relative freedom from shrinkage, and is especially suitable for use in automotive gasketing operations.

EXAMPLE IV

This example further illustrates the invention, and particularly shows the improvements in shrinkage characteristics obtainable by using polyethylene. Also illustrated is a modification of the invention in which the Butyl rubber is modified, prior to incorporating it in the composition, by milling it with a small amount of a curative (dinitrosobenzene).

| | Parts | | | |
|---|---|---|---|---|
| | Mix A | Mix B | Mix C | Mix D |
| Isobutylene:isoprene copolymer rubber containing 2.5–3.0% isoprene ("Enjay 365" non-staining) | 100 | 100 | 100 | 100 |
| Dinitrosobenzene ("Polyac") | | | 0.5 | 0.5 |
| Polyethylene ("Alathon 10") | 25 | 25 | | |
| Carbon black ("Pelletex" semi-reinforcing furnace black) | 40 | | | |
| Carbon black ("Philblack A") | | | 40 | 40 |
| Gelled castor oil ("Polycin 783") | 10 | 10 | 10 | 10 |
| Petrolatum | 30 | 10 | 15 | 15 |
| Stearic acid | 1 | 1 | 1 | 1 |
| Zinc oxide ("#166") | 5 | 5 | 5 | 5 |
| Titanium dioxide ("Titanox RANC") | | 20 | | |
| Phthalic anhydride ("ESEN") | 1 | 1 | 1.6 | 1.6 |
| Sulfur | 2 | 2 | 1.6 | 1.6 |
| p-Quinonedioxime ("GMF") | 2 | 2 | 1.6 | 1.6 |
| Benzothiazyl disulfide ("Altax") | 4 | 2 | 3.3 | 3.3 |
| 4,4'-Dithiodimorpholine ("Sulfasan-R") | | 2 | | |
| Azodicarbonamide ("Celogen AZ") | 10 | 10 | 10 | 10 |
| Wax ("Sun Proof") | | | | 10 |
| Total | 230 | 192 | 189.6 | 199.6 |

In mixes C and D, the Butyl rubber and Polyac were reacted (without blowing agent and curatives) by working on a roll mill for 5 minutes at 300° F. The blowing agent and curatives were added later on a mill at a temperature of 140°–150° F.

Samples of each stock were extruded and subsequently expanded and vulcanized as in Example I.

Samples of the expanded materials were allowed to age at room temperature for periods ranging up to 70 days. The dimensions of the samples were noted from time to time, and compared to the original dimensions. Table I, below, in Part A, shows the results in terms of percent shrinkage, that is, the total percent differences from the original measurements.

In addition to the room temperature aging, other samples were subjected to an accelerated cyclic aging, consisting of a 24 hour period at 158° F., followed by a 24 hour period at room temperature. The cycle was repeated 15 times (covering a period of 30 days), and measurements were made at intervals with the results shown in Part B of Table I. The calculation of the shrinkage in area is difficult because of the geometry of the cross-sections, and therefore the values given indicate relative magnitudes rather than absolute quantities.

Table I.—Percent shrinkage

A. AGING AT ROOM TEMPERATURE

| | Mix A | | Mix B | | Mix C | | Mix D | |
|---|---|---|---|---|---|---|---|---|
| | Linear | Area | Linear | Area | Linear | Area | Linear | Area |
| 5 Days at R.T. | 0.4 | | 0.0 | | 0.0 | | 1.0 | |
| 13 Days, R.T. | 0.4 | | 0.0 | | 1.0 | | 2.1 | |
| 20 Days, R.T. | 0.4 | | 0.0 | | 1.0 | | 2.6 | |
| 35 Days, R.T. | 0.0 | | 0.0 | | 1.3 | | 2.7 | |
| 70 Days, R.T. | 0.0 | | 1 −0.5 | | 2.6 | | 3.7 | |

B. ACCELERATED AGING—15 CYCLES—ALTERNATE 24 HRS./185° F.; 24 HRS./R.T.

| | Mix A | | Mix B | | Mix C | | Mix D | |
|---|---|---|---|---|---|---|---|---|
| | Linear | Area | Linear | Area | Linear | Area | Linear | Area |
| No. of Cycles: | | | | | | | | |
| 1 | 0.7 | 1.6 | 0.4 | 2.3 | 1.6 | 6.5 | 1.9 | 11.8 |
| 5 | 1.1 | 8.2 | 0.9 | 8.3 | 3.9 | 16.7 | 5.3 | 19.8 |
| 10 | 1.3 | 4.8 | 1.2 | 6.5 | 5.3 | 11.3 | 6.7 | 16.2 |
| 15 (30 Days) | 1.4 | 4.5 | 1.5 | 6.8 | 6.0 | 12.0 | 8.0 | 18.0 |

[1] Negative shrinkage indicates increase in dimension.

The extraordinary dimensional stability of the expanded material containing polyethylene will be apparent from the foregoing data.

Extruded sheets of the unexpanded, unvulcanized material may be cut into desired shapes, such as shoe soles, the scrap being returned for re-extrusion, while the soles may be expanded and cured in the open as described, before or after assembling with a shoe.

From the foregoing description it will be apparent that the invention possesses many advantages, consequent to the simplified, economical procedure employed. The enjoyment of the advantages of such a procedure is made possible by the selection of butyl rubber composition of the kind described. Because of the low permeability of butyl rubber to gas, and because of the special relationship between the vulcanization characteristics of the composition and the decomposition characteristics of the azodicarbonamide, a closed cell product of good dimensional stability and many other desirable characteristics, is readily obtainable.

It is desired to emphasize that the results obtainable with butyl rubber (which contains little unsaturation) as described are not in general obtainable with other elastomers, such as the typical highly unsaturated sulfur-vulcanizable copolymers, viz., butadiene-styrene copolymer rubber, insofar as the present inventor is aware. The inoperability of such highly unsaturated sulfur vulcanizable rubbers as butadiene-styrene emphasizes the unexpectedness of the results obtained with butyl rubber. Since butyl rubber is much less unsaturated, one might expect, if anything, that it would not become vulcanized rapidly enough to retain the gas as it is liberated by the blowing agent. The ability of butyl rubber to thus yield a cellular product without prevulcanization is therefore unexpected.

Although butyl rubber is a relatively "dead" rubber, the material made by the present process remains quite bouncy or lively, possibly because the gas is retained in the cells of the butyl rubber.

Having thus described my invention, what I claim and desire to protect by Letters Patent is:

1. A method of making a closed-cell expanded elastomeric article having a desired shape comprising compounding 100 parts by weight of butyl rubber with from 0.25 to 4 parts of a substance selected from the group consisting of p-quinonedioxime and dibenzoyl-p-quinonedioxime, from 1 to 4 parts of benzothiazyl disulfide, from 0.5 to 4 parts of a substance selected from the group consisting of tetrachloro-p-benzoquinone and sulfur, and from 1 to 20 parts of azodicarbonamide, extruding the resulting mixture in an unvulcanized, unblown state at a temperature below the decomposition temperature of the azodicarbonamide and below the temperature at which the mixture would become substantially vulcanized during the extrusion, which extrusion temperature is within the range from room temperature to 275° F., thereby forming a coherent, shaped, unvulcanized and unblown article which is a miniature of the finally desired shape, and thereafter heating the unvulcanized miniature shape in the open to a temperature sufficiently elevated to vulcanize the mixture and to decompose the azodicarbonamide, which heating temperature is within the range from 280° to 400° F. and is maintained for a period of from 10 minutes to 2 hours, whereby the miniature expands to form a vulcanized cellular elastomeric article of the desired shape, said butyl rubber being a synthetic rubbery copolymer of a multi-olefinic unsaturate having from 4 to 6 carbon atoms with an isoolefin having from 4 to 7 carbon atoms, said copolymer containing from 0.5 to 10% of the multi-olefinic unsaturate.

2. A method as in claim 1 in which from 5 to 100 parts of polyethylene resin is initially mixed with the said butyl rubber.

3. A method of making a closed-cell expanded elastomeric article having a desired shape comprising compounding 100 parts by weight of butyl rubber with from 0.5 to 2 parts of a substance selected from the group consisting of p-quinonedioxime and dibenzoyl-p-quinonedioxime, from 2 to 4 parts of benzothiazyl disulfide, from 1 to 2 parts of a substance selected from the group consisting of tetrachloro-p-benzoquinone and sulfur, and from 8 to 14 parts of azodicarbonamide, extruding the resulting mixture in an unvulcanized, unblown state at a temperature below the decomposition temperature of the azodicarbonamide and below the temperature at which the mixture would become substantially vulcanized during the extrusion, which extrusion temperature is within the range from room temperature to 275° F., thereby forming a coherent, shaped, unvulcanized and unblown article which is a miniature of the finally desired shape, and thereafter heating the unvulcanized miniature shape in the open to a temperature sufficiently elevated to vulcanize the mixture and to decompose the azodicarbonamide, which heating temperature is within the range from 320° to 350° and is maintained for a period of from 10 minutes to 2 hours, whereby the miniature expands to form a vulcanized cellular elastomeric article of the desired shape, said butyl rubber being a synthetic rubbery copolymer of a multi-olefinic unsaturate having from 4 to 6 carbon atoms with an isoolefin having from 4 to 7 carbon atoms, said copolymer containing from 0.5 to 5% of the multi-olefinic unsaturate.

4. A method as in claim 3 in which from 15 to 25 parts of polyethylene resin is initially mixed with the said butyl rubber.

5. A composition which upon heating to a temperature of from 280° to 400° F. for a period of from 10 minutes to 2 hours simultaneously expands and vulcanizes to form a closed cell cellular elastomeric article, comprising a uniform mixture of 100 parts by weight of butyl rubber, from 0.25 to 4 parts of a substance selected from the group consisting of p-quinonedioxime and dibenzoyl-p-quinonedioxime, from 1 to 4 parts of benzothiazyl disulfide, from 0.5 to 4 parts of a substance selected from the group consisting of tetrachloro-p-benzoquinone and sulfur, and from 1 to 20 parts of azodicarbonamide, said butyl rubber being a synthetic rubbery copolymer of a multi-olefinic unsaturate having from 4 to 6 carbon atoms with an isoolefin having from 4 to 7 carbon atoms, said copolymer containing from 0.5 to 10% of the multi-olefinic unsaturate.

6. A composition as in claim 5 containing additionally from 5 to 100 parts of polyethylene resin.

7. A composition which upon heating to a temperature of from 280° to 400° F. for a period of from 10 minutes to 2 hours simultaneously expands and vulcanizes to form a closed cell cellular elastomeric article, comprising a uniform mixture of 100 parts by weight of butyl rubber, from 0.5 to 2 parts of a substance selected from the group consisting of p-quinonedioxime and dibenzoyl-p-quinonedioxime, from 2 to 4 parts of benzothiazyl disulfide, from 1 to 2 parts of a substance selected from the group consisting of tetrachloro-p-benzoquinone and sulfur, and from 8 to 14 parts of azodicarbonamide, said butyl rubber being a synthetic rubbery copolymer of a multi-olefinic unsaturate having from 4 to 6 carbon atoms with an isoolefin having from 4 to 7 carbon atoms, said copolymer containing from 0.5 to 10% of the multi-olefinic unsaturate.

8. A composition as in claim 7 containing additionally from 15 to 25 parts of polyethylene resin.

9. A method as in claim 3 in which the substance selected from the said first-mentioned group is p-quinonedioxime and the said butyl rubber is a copolymer of from 0.5 to 5% of isoprene with from 99.5 to 95% of isobutylene.

10. A method as in claim 3 in which the substance selected from said first-mentioned group is dibenzoyl-p-quinonedioxime, and the said butyl rubber is a copolymer of from 0.5 to 5% of isoprene with from 99.5 to 95% of isobutylene.

11. A method as in claim 3 in which the substance selected from said second-mentioned group is tetrachloro-p-benzoquinone, and the said butyl rubber is a copolymer of from 0.5 to 5% of isoprene with from 99.5 to 95% of isobutylene.

12. A method as in claim 3 in which the substance selected from said second-mentioned group is sulfur, and the said butyl rubber is a copolymer of from 0.5 to 5% of isoprene with from 99.5 to 95% of isobutylene.

13. A shaped, vulcanized, elastomeric, closed cell cellular article, comprising an expanded mixture of 100 parts by weight of butyl rubber, from 5 to 100 parts of polyethylene resin, from 0.25 to 4 parts of a substance selected from the group consisting of p-quinonedioxime and dibenzoyl-p-quinonedioxime, from 1 to 4 parts of benzothiazyl disulfide, from 0.5 to 4 parts of a substance selected from the group consisting of tetrachloro-p-benzoquinone and sulfur, and the decomposition residue of from 1 to 20 parts of azodicarbonamide, said butyl rubber being a synthetic rubbery copolymer of a multi-olefinic unsaturate having from 4 to 6 carbon atoms with an isoolefin having from 4 to 7 carbon atoms, said copolymer containing from 0.5 to 10% of the multiolefinic unsaturate.

14. A shaped, vulcanized, elastomeric, closed cell cellular article, comprising an expanded mixture of 100 parts by weight of butyl rubber, from 15 to 25 parts of polyethylene resin, from 0.5 to 2 parts of a substance selected from the group consisting of p-quinonedioxime and dibenzoyl-p-quinonedioxime, from 2 to 4 parts of benzothiazyl disulfide, from 1 to 2 parts of a substance selected from the group consisting of tetrachloro-p-benzoquinone and sulfur, and the decomposition residue of from 8 to 14 parts of azodicarbonamide, said butyl rubber being a synthetic rubbery copolymer of a multi-olefinic unsaturate having from 4 to 6 carbon atoms with an isoolefin having from 4 to 7 carbon atoms, said copolymer containing from 0.5 to 10% of the multi-olefinic unsaturate.

15. An article as in claim 14, in which the said butyl rubber is a copolymer of from 0.5 to 5% of isoprene with from 99.5 to 95% of isobutylene.

References Cited in the file of this patent
UNITED STATES PATENTS

| | | |
|---|---|---|
| 2,256,483 | Johnston | Sept. 23, 1941 |
| 2,299,593 | Roberts et al. | Oct. 20, 1942 |
| 2,383,839 | Beekley | Aug. 28, 1945 |
| 2,833,731 | Pfisterer et al. | May 6, 1958 |

OTHER REFERENCES

Whitby: "Synthetic Rubber," copyright 1954, pages 867 and 868.

Morgan: "Plastics Progress," 1955, copyright 1956, pages 51 to 80; pages 69 and 70 relied upon.